United States Patent [19]
Longacre, Jr.

[11] Patent Number: 5,479,515
[45] Date of Patent: Dec. 26, 1995

[54] ONE-DIMENSIONAL BAR CODE SYMBOLOGY AND METHOD OF USING SAME

[75] Inventor: Andrew Longacre, Jr., Skaneateles, N.Y.

[73] Assignee: Welch Allyn, Inc., Skaneateles Falls, N.Y.

[21] Appl. No.: 241,297

[22] Filed: May 11, 1994

[51] Int. Cl.⁶ ........................................... G09C 1/06
[52] U.S. Cl. ................... 380/54; 380/51; 235/463
[58] Field of Search ........................ 380/54, 29, 46, 380/51, 59; 235/494, 462, 463

[56] References Cited

U.S. PATENT DOCUMENTS

| | | | |
|---|---|---|---|
| 3,887,792 | 6/1975 | Williams | 235/61.11 E |
| 4,059,224 | 11/1977 | Seligman . | |
| 4,354,101 | 10/1982 | Hester et al. | 235/463 |
| 4,794,239 | 12/1988 | Allais . | |
| 4,973,829 | 11/1990 | Ishida et al. . | |
| 5,113,445 | 5/1992 | Wang . | |
| 5,159,635 | 10/1992 | Wang . | |
| 5,241,164 | 8/1993 | Pavlidis et al. . | |
| 5,243,655 | 9/1993 | Wang . | |
| 5,337,362 | 8/1994 | Gormish et al. | 380/54 |

FOREIGN PATENT DOCUMENTS 0385478  5/1990  European Pat. Off. .

OTHER PUBLICATIONS

AIM$^{USA}$ "Uniform Symbology Specification Code One".

*Primary Examiner*—David C. Cain
*Attorney, Agent, or Firm*—Harris Beach & Wilcox

[57] ABSTRACT

A linear bar code symbology combines delta distance start and stop patterns, a space efficient, bit oriented data character structure, and Reed-Solomon redundancy for error detection and correction. A method of writing the bar code structures onto a character medium and reading the resulting symbols under adverse conditions is presented.

18 Claims, 10 Drawing Sheets

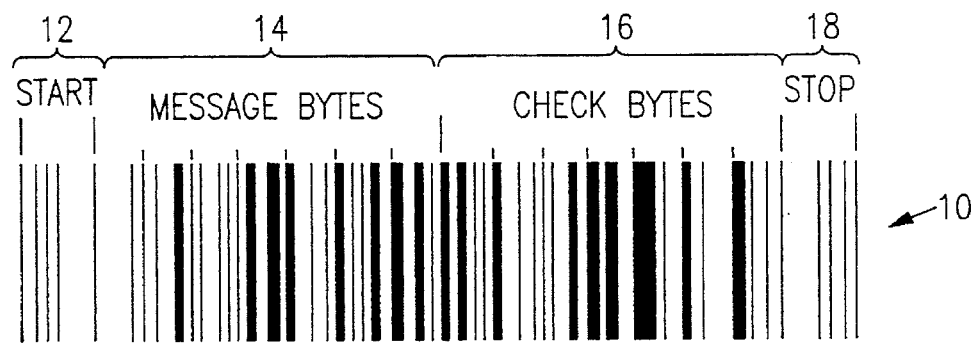
FIG.1
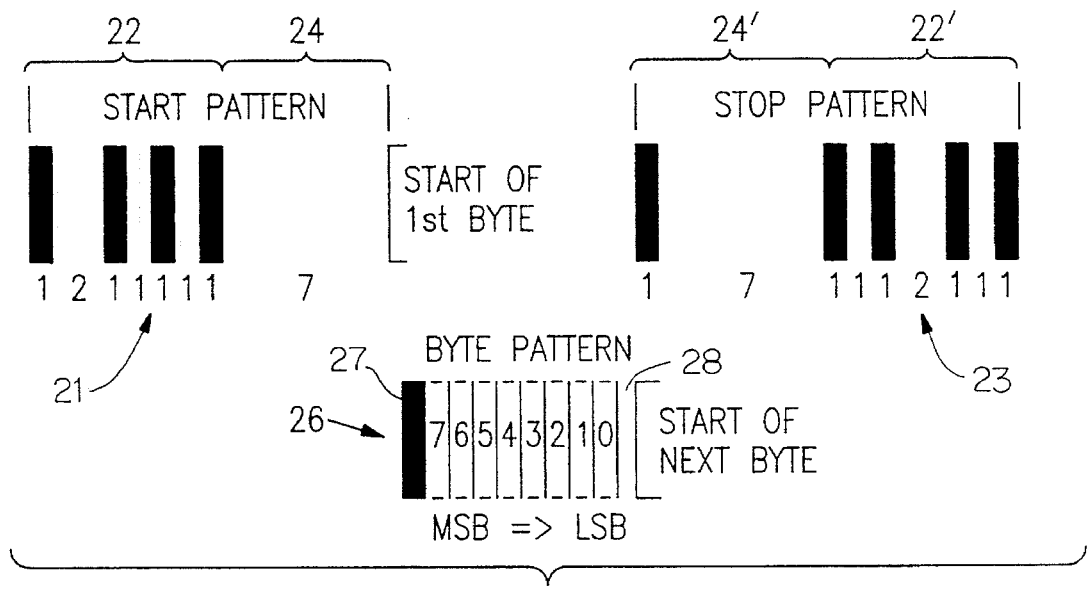
FIG.2
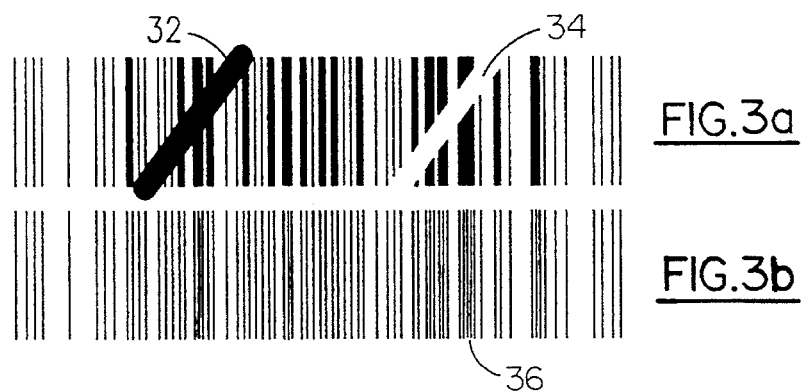
FIG.3a
FIG.3b 5,479,515

ONE-DIMENSIONAL BAR CODE SYMBOLOGY AND METHOD OF USING SAME

BACKGROUND OF THE INVENTION

1. Field of the Invention.

This invention relates to a bar code symbology that can be accurately decoded despite misreads or altered symbols. More particularly this invention relates to a 1-dimensional, fixed format bar code symbology designed to resist the effects of unintended internal spaces and occasional bar location errors that are typical of impact dot-matrix printing, while also offering high security and error checking capability. The symbology combines "delta distance" start and stop patterns, a space-efficient bit-oriented data character structure, and Reed-Solomon redundancy for error detection and correction.

2. Description of the Prior Art.

Installed receipt printers at activities such as lottery outlets may wear mechanically and exhaust their ribbons to the point that any traditional bar code symbols printed by them are unreadable, for two reasons: (1) spaces may appear between adjacent dot rows, that is, within wide "bars," and (2) occasional dot rows are mispositioned by as much as one half of a dot spacing. The conventional bar code symbologies, scanners, and decoders are poorly designed to tolerate these sorts of errors.

There are two basic methods for making a bar code pattern robust against unintended spaces. The first is to build it with only narrow bars separated by spaces 1, 2, and up to "n" dot modules wide, with only the spaces' widths carrying any significance; this is known in the art as a "delta distance" code. The second method is to adopt a fixed-width pattern structure that encourages decoding by time slicing each character into modules, then sampling each module's midpoint for the data bits.

Bar code symbologies generally incorporate start and stop patterns for ease of decoding. Several delta distance symbologies have been developed, from an early IBM code (designed to be printable by line printers) to "BC412" recently adopted for use on semiconductor wafers. These symbologies generally require a quiet zone prior to the beginning of the bar code information. PDF417, a newer two dimensional bar code systems has start and stop codes which are not delta distance, and has relaxed constraints on the quiet zone. However PDF417 does require at least a minimal quiet zone.

Code One is a two-dimensional matrix symbology that can encode the full ASCII 256 character set in addition to four function characters and a pad character. This symbology has ten different versions defined, with 27–50% of the symbol characters allocated to error detection and correction. Some versions do not require quiet zones. Other versions use Reed-Solomon error correction check words.

To the inventor's knowledge, a one dimensional fixed format bar code structure combining "delta distance" start and stop patterns, a space-efficient bit-oriented data character structure, and Reed-Solomon redundancy for error detection and correction has not been realized in the art.

SUMMARY OF THE INVENTION

It is therefore a primary object of the present invention to provide a linear bar code symbology that is capable of being read despite suboptimal presentation on a carrier medium and can be accurately read under generally adverse printing and reading conditions.

It is another object of the invention to provide an linear bar code symbology that possesses error correcting capabilities.

It is still another object of the invention to provide a robust linear bar code symbology suitable for use with inexpensive printers that can only print bars having constant width dimensions.

These and other objects of the present invention are attained by a novel 1-D bar code symbology, named "Code Z," designed to resist the effects of unintended internal spaces and occasional bar location errors. Code Z is conceived as a fixed-length symbology, though the length and level of Reed-Solomon redundancy within any closed system can be selected by the user. Different systems based on different symbol lengths or different $2^8$ Galois Field number systems may coexist without compromising each other.

In a first aspect of the invention a bar code structure containing encoded information also includes start and stop patterns and a predetermined number of code words therebetween, all of which are arranged in a single row. The code words are formed of a plurality of bars and spaces, each having identical width dimensions, and are separated from one another by either a bar or a space. The structure includes at least one data word and at least one check word that is calculated from the data word by Reed-Solomon encoding.

In another aspect of the invention the start pattern and the stop pattern are each defined by a group consisting of a plurality of identical bars alternating with spaces that can vary in width; and by a third space that is wider than the group. Preferably there are two bars and three variable spaces in the group.

In another aspect of the invention the code words include seven data bytes and seven check bytes, each formed of 8 bit packets, and the Reed-Solomon encoding is performed systematically using a $2^8$ Galois Field.

In another form of the invention, the bar code structures are generated by entering data into a data entry device; encoding the data into a representation of the bar code symbol; and transferring an image of the bar code symbol onto a carrier medium. The symbols are then scanned and an error detection and correction process undertaken by Reed Solomon decoding. This is done by first computing all syndromes of the code words, and then generating a locator polynomial by the application of Massey's algorithm to the syndromes. The roots of the locator polynomial are determined by a Chien search, and a Forney procedure is then performed utilizing the roots, the syndromes and the code words to correct errors in the code words. The decoded character values are then output.

BRIEF DESCRIPTION OF THE DRAWING

For a better understanding of these and other objects of the present invention, reference is made to the detailed description of the invention which is to be read in conjunction with the following drawings, wherein:

FIG. 1 shows a bar code structure in accordance with the invention;

FIG. 2 is a detailed, schematic illustration of the start pattern, stop pattern, and byte patterns of the bar code structure of FIG. 1;

FIGS. 3a and 3b show the structure of FIG. 1 reduced in scale, and having certain printing defects that can nevertheless be compensated in accordance with the invention;

DESCRIPTION OF THE PREFERRED EMBODIMENT

MATHEMATICAL SYMBOL STRUCTURE

Figure 4:
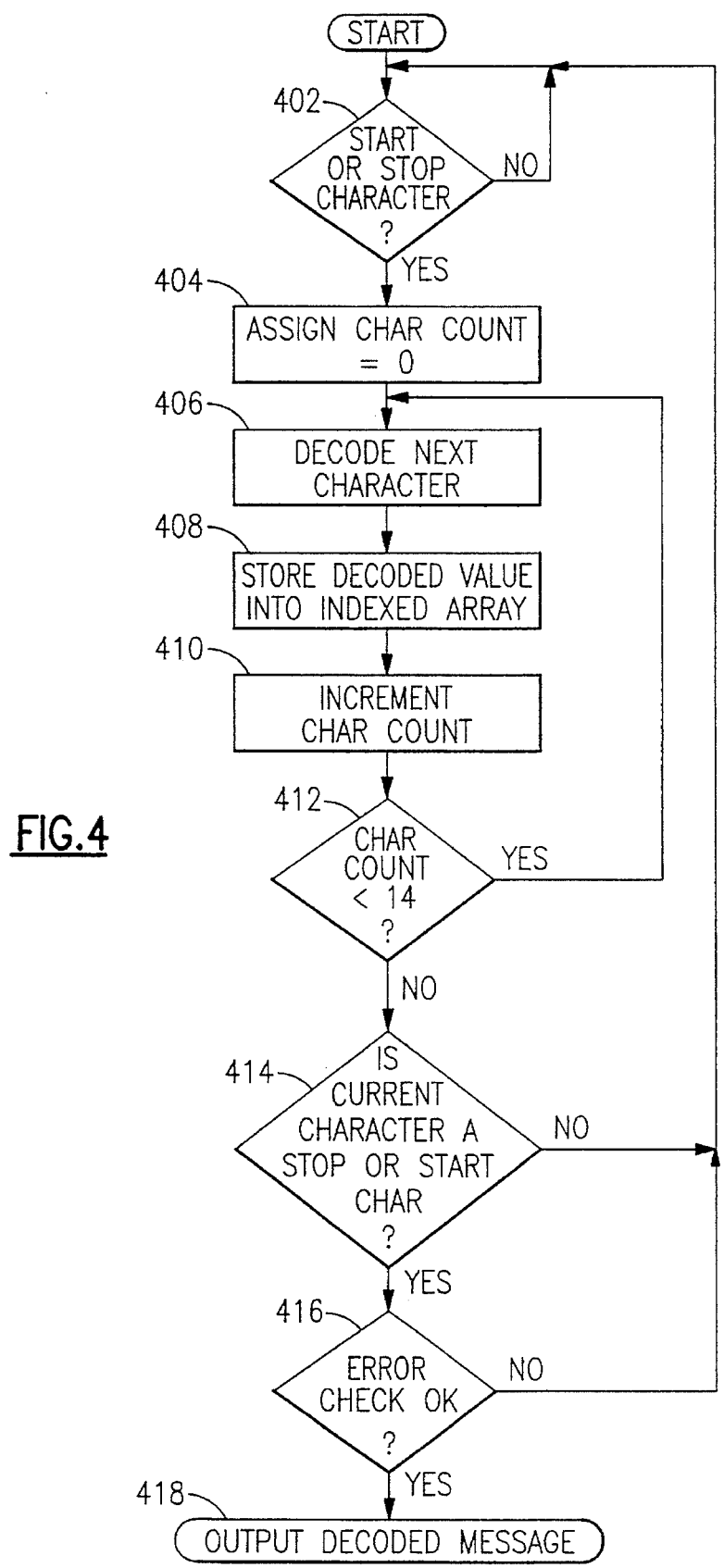
FIG. 4 is a flow chart indicating a high level decoding algorithm for the bar code structure of FIG. 1.
Figure 5:
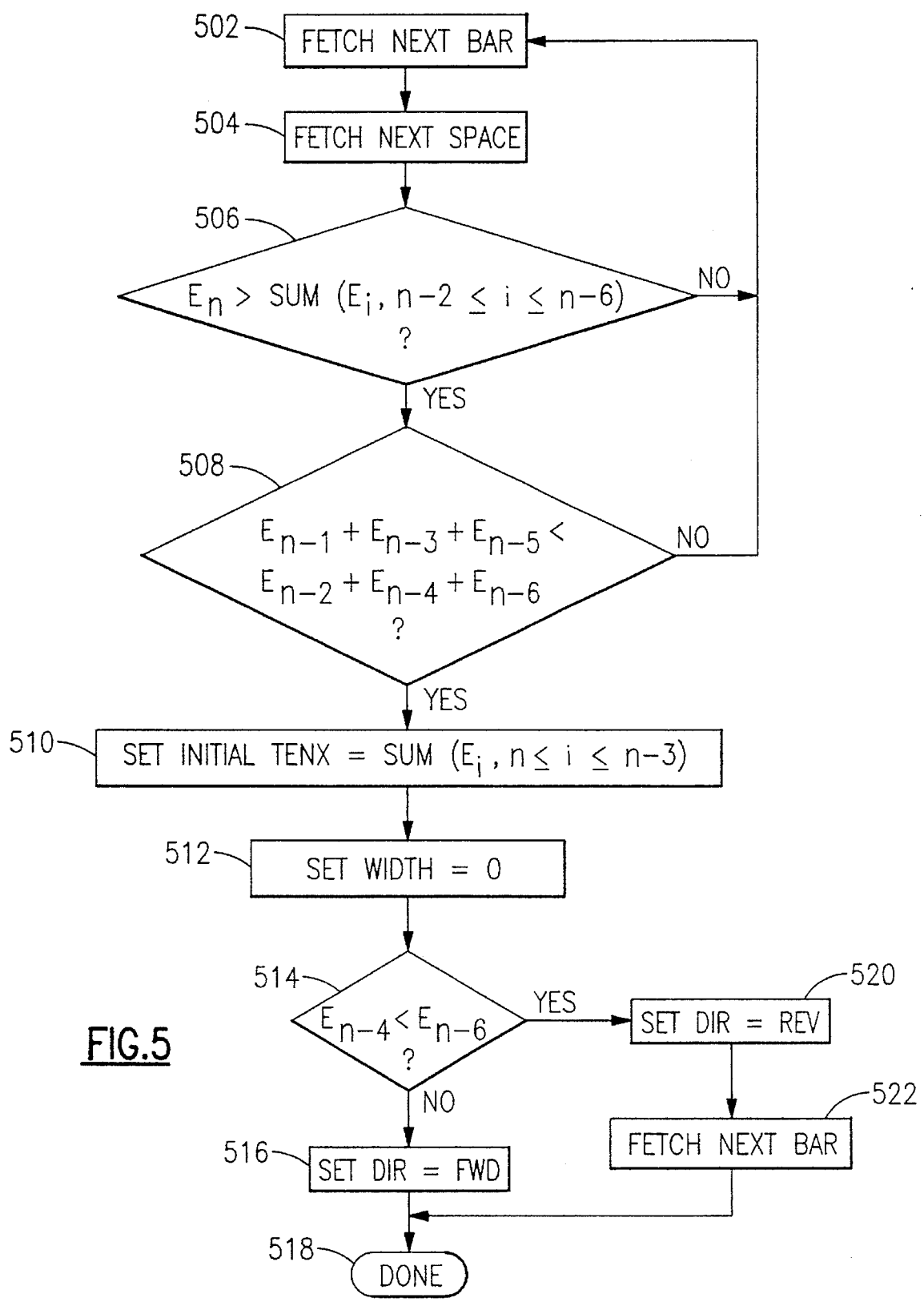
FIG. 5 is a flow chart indicating the process of detecting a start or stop pattern during the decoding of the bar code structure of FIG. 1.
Figure 6:
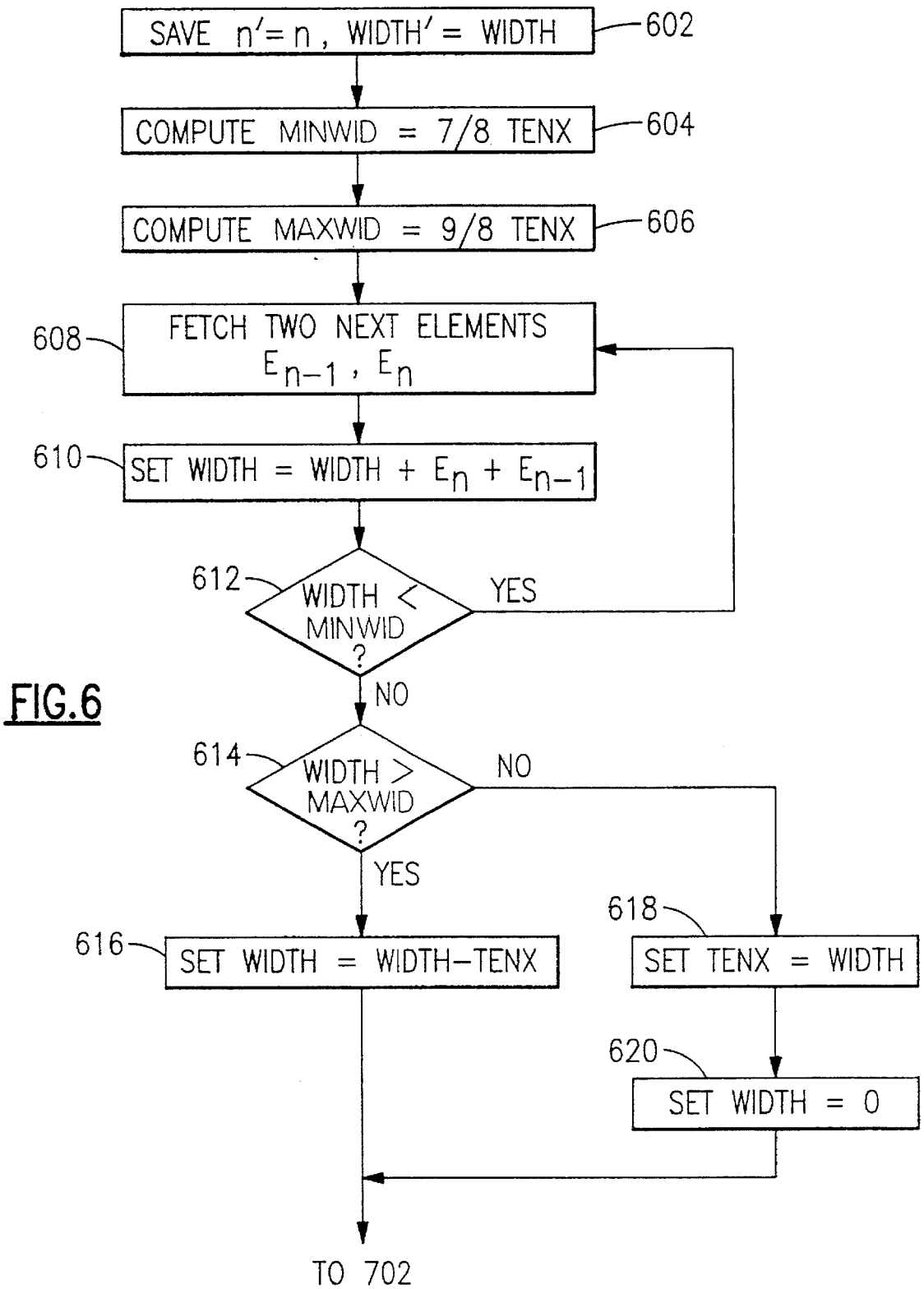
FIGS. 6 and 7 are flow charts indicating the process of decoding a character within the bar code structure of FIG. 1.
Figure 7:
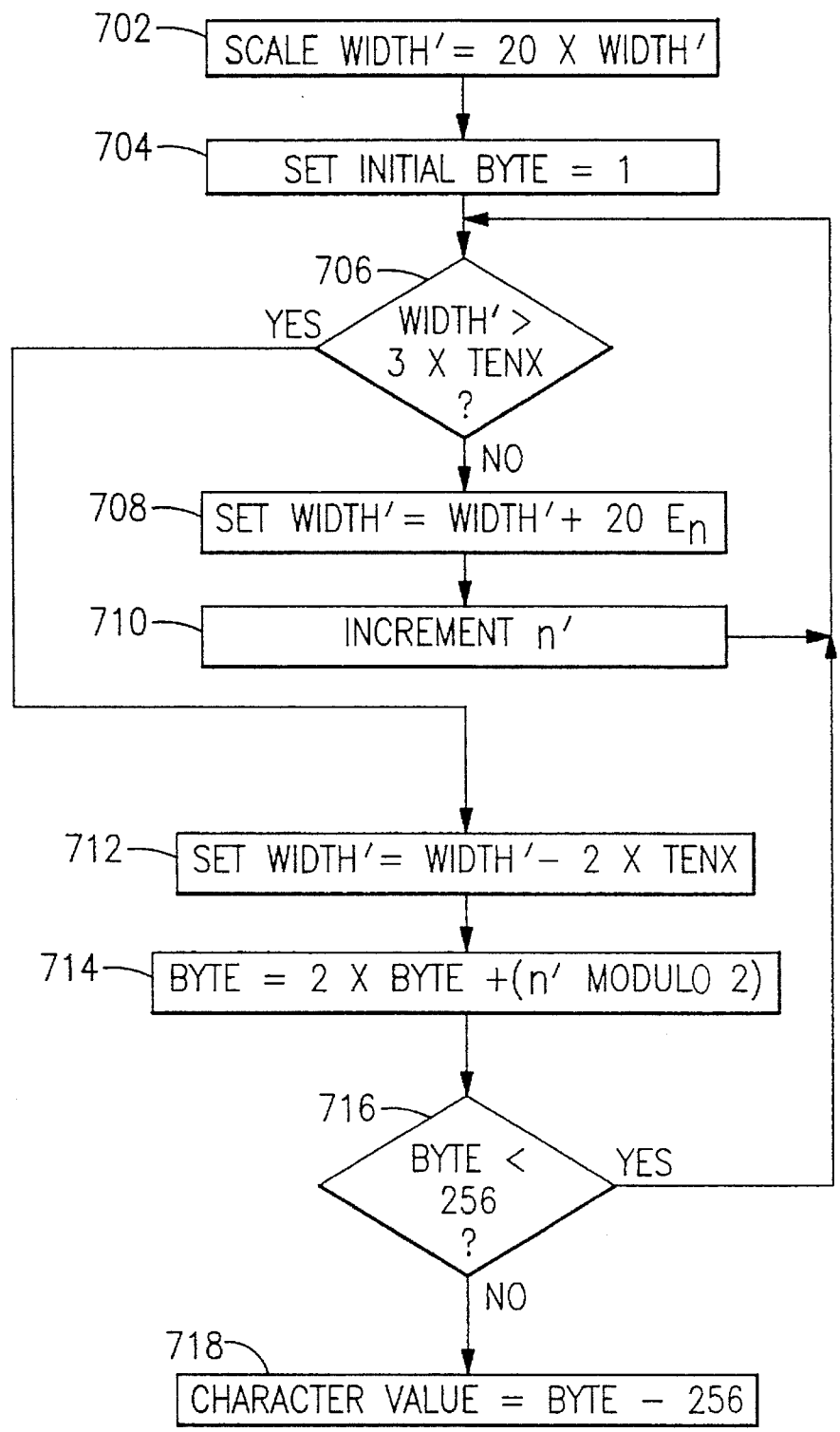
Figure 8:
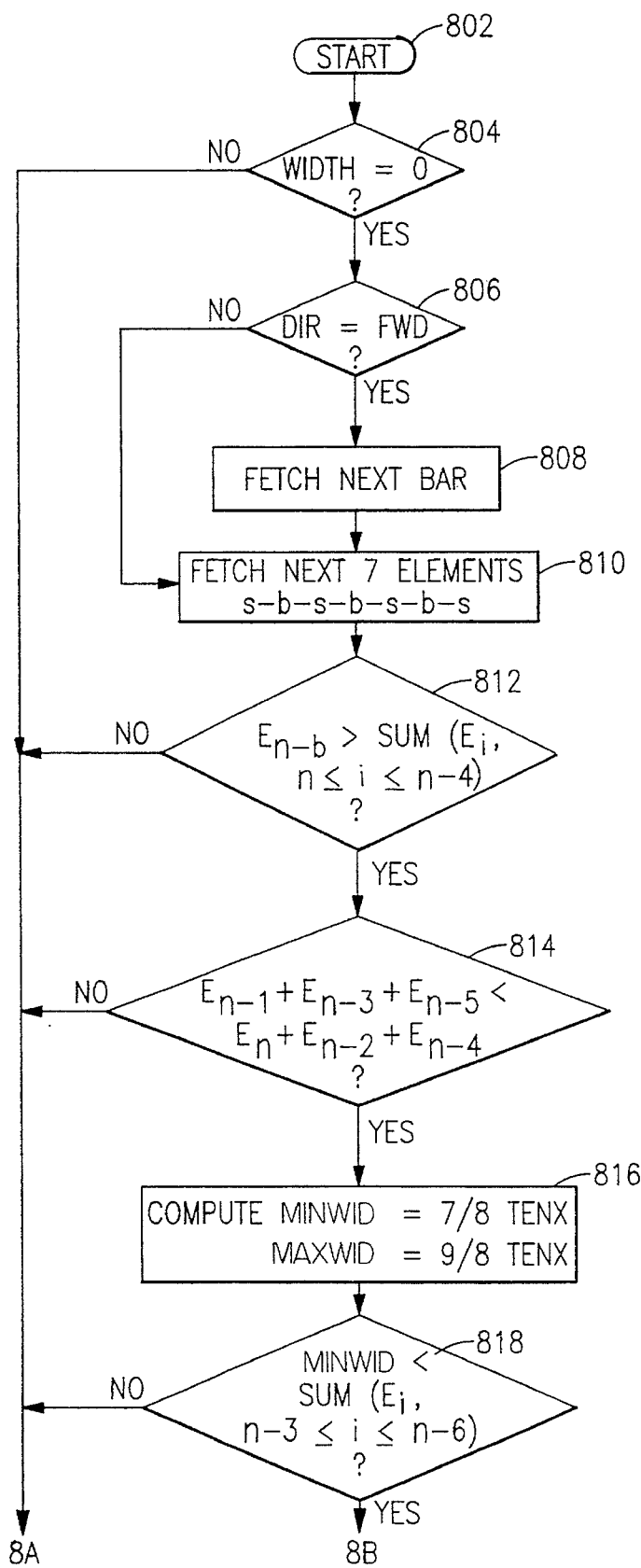
FIGS. 8 and 9 are flow charts depicting the process of confirming a stop or start character within the bar code structure of FIG. 1.
Figure 9:
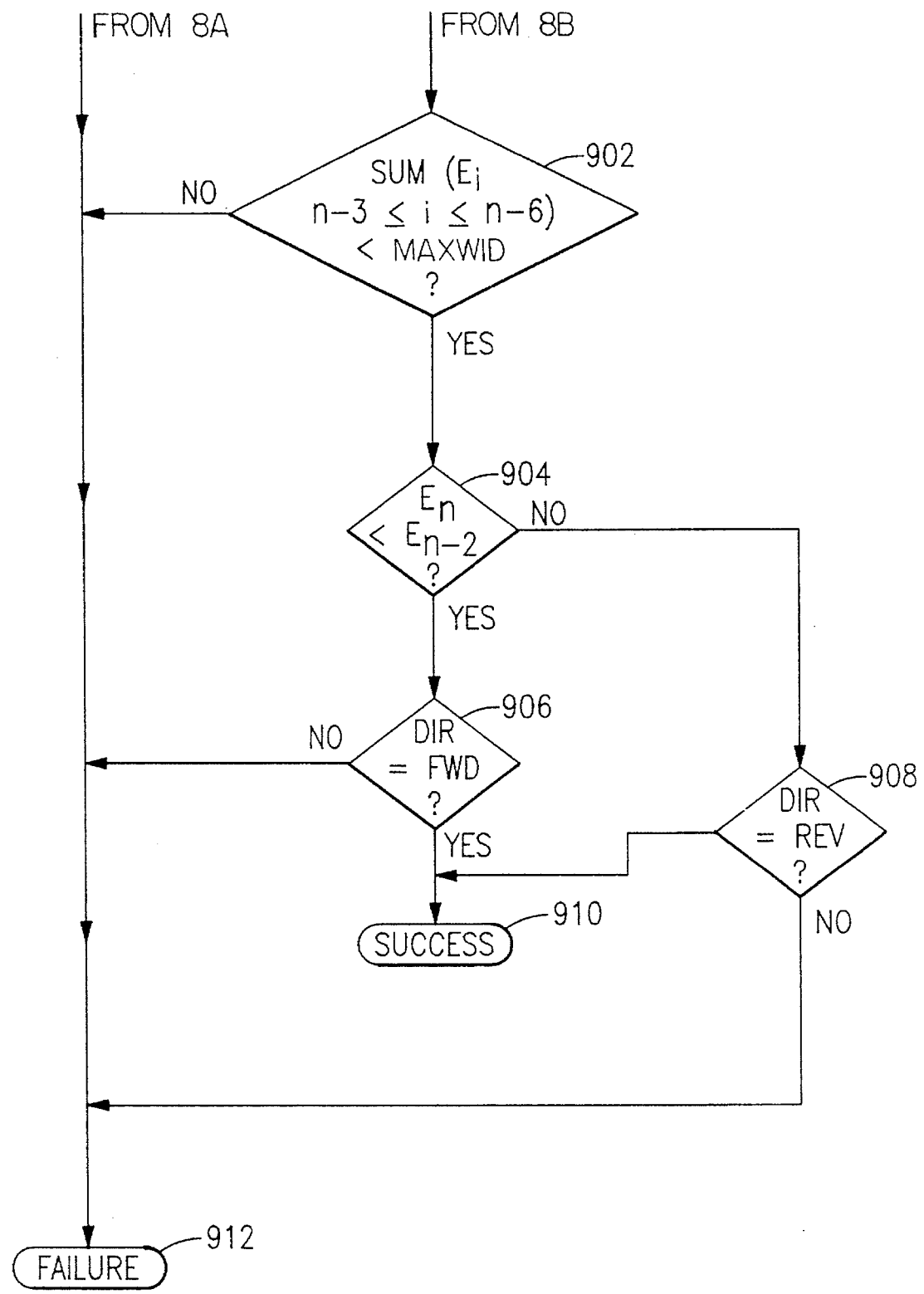
Figure 10:
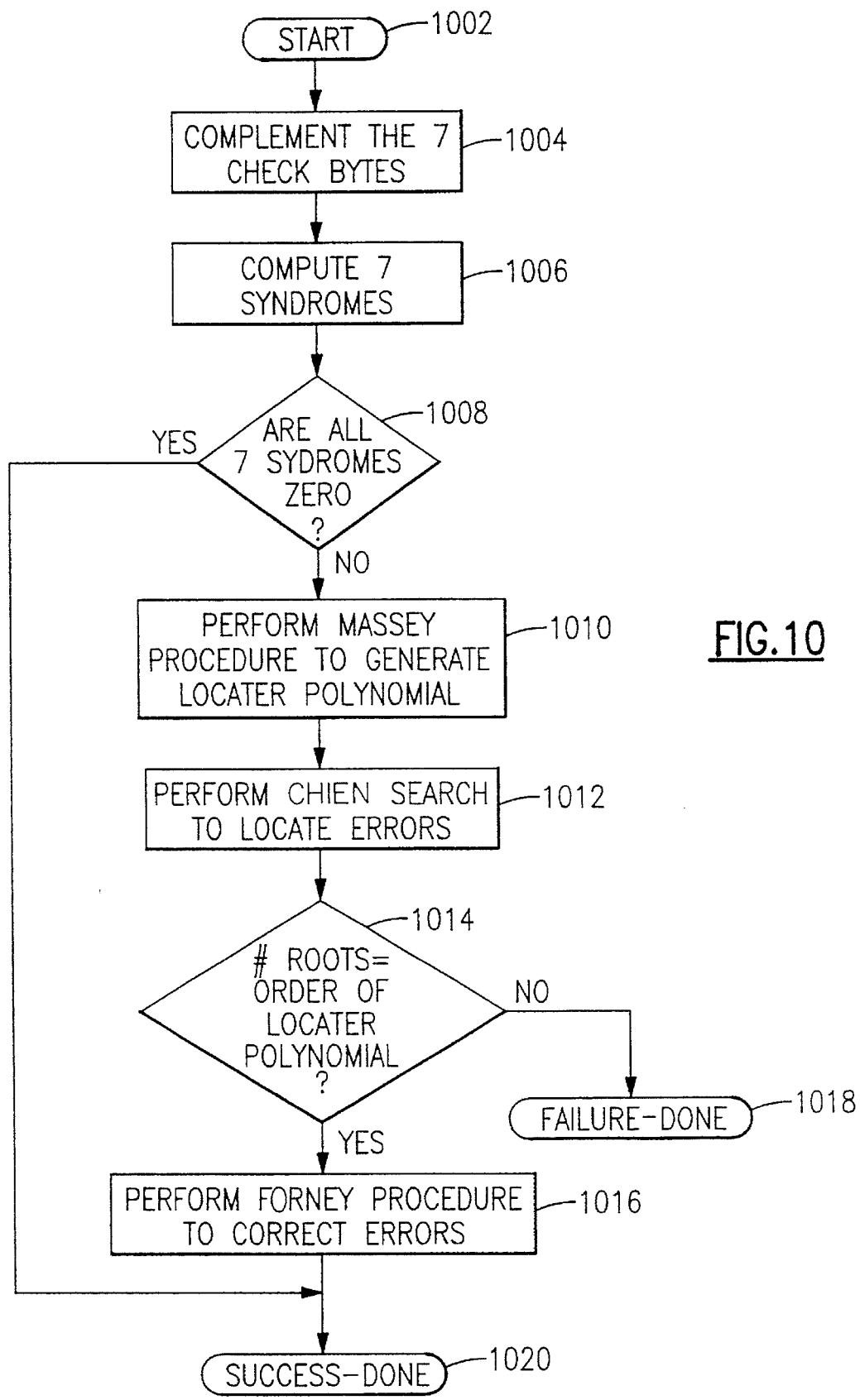
FIG. 10 is a flow chart depicting the process of error checking and correction in the bar code structure of FIG. 1.

Code Z is a byte-based symbology, encoding both data and check words in 8-bit packets. To fit the intended application, the symbol has been set to hold 14 bytes of which 7 are data and 7 are for error detection and correction.

For complete flexibility, the seven data bytes are expressed in 14 hexadecimal ASCII characters, e.g. "0123456789ABCD". From these 7 bytes an additional 7 check bytes are calculated using Reed-Solomon encoding and a $2^8$ Galois Field (hereinafter GF(256)), which is the same number system established for Code One. This byte-oriented Galois Field is calculated byte-wise mod 301 and bit-wise mod 2.

In order to explain how the check words are calculated, fragments of a BASIC language encoding program are offered for illustration. Listing 1 presents portions defining the GF(256) and its mathematical operations. First a subroutine LOGALG creates appropriate log and antilog tables. Functions PROD for byte multiplication and QUOT for byte division are then defined. Byte addition and subtraction are both performed by a bit-wise exclusive-OR (BASIC's XOR) function.

LISTING 1

BASIC Math Routines establishing GF(256)

```
LOGALG: DIM LG(255), AL(255)
PRIMPOLY=301
LG(0)=–256
  AL(0)=1
FOR I=1 to 255
AL(I)=AL(I–1)*2
IF AL(I)>=256 THEN AL(I)=AL(I) XOR PRIMPOLY
LG(AL(I))=I
NEXT I
RETURN
FUNCTION PROD (X, Y)
IF (X=0) OR (Y=0) THEN
  PROD=0
ELSE
  PROD=AL((LG(X)+LG(Y)) MOD 255)
END IF
END FUNCTION
FUNCTION QUOT (X, Y)
IF (X=0) THEN
  QUOT=0
ELSE
  IF (Y=0) THEN
    QUOT=–255
  ELSE
    QUOT=AL((LG(X)–LG(Y)+255) MOD 255)
  END IF
END IF
END FUNCTION
```

LISTING 2

Subroutine creating the Generator Polynomial

```
GENPOL:NDAT=7L:NCHK=7
DIM DAT(NDAT), CHK(NCHK), POLY(NCHK)
POLY (0)=1
FOR I=0 TO NCHK–1
POLY(I+1)=POLY(I)
FOR J=I TO 1 STEP –1
  POLY(J)=POLY(J–1) XOR PROD(POLY(J), AL(I))
  NEXT J
  POLY(0)=PROD(POLY(0), AL(I))
NEXT I
RETURN
```

Using GF(256), Reed Solomon encoding with "NCHK" checkwords begins by creating a "generation polynomial" whose roots are the first "NCHK" powers of 2. Listing 2 presents a subroutine GENPOL that first sets NCHK=NDAT=7 and establishes the corresponding arrays DAT() for data bytes and CHK() for check bytes, then it calculates in POLY() the coefficients of the generation polynomial. Then, for any collection of BIDAT data byte values accepted into DAT(), Listing 3 presents the subroutine CHECKS that computes the corresponding NCHK check byte values. For Code Z this process includes a final nonstandard step of complementing all the check values to avoid the degenerative case of all-zero data with all-zero checks.

LISTING 3

BASIC Subroutine computing the Check Bytes

```
CHECKS: ERASE CHK
REM initialize all chk[] to zero
FOR I=1 TO NDAT
K=CHK(1) XOR DAT(I)
FOR J=1 TO NCHK
  CHK(J)=CHK(J+1) XOR PROD(K, POLY(NCHK–J))
NEXT J
FOR I=1 TO NCHK
  CHK(I)=255–CHK(I)
NEXT I
RETURN
```

Figure 12:
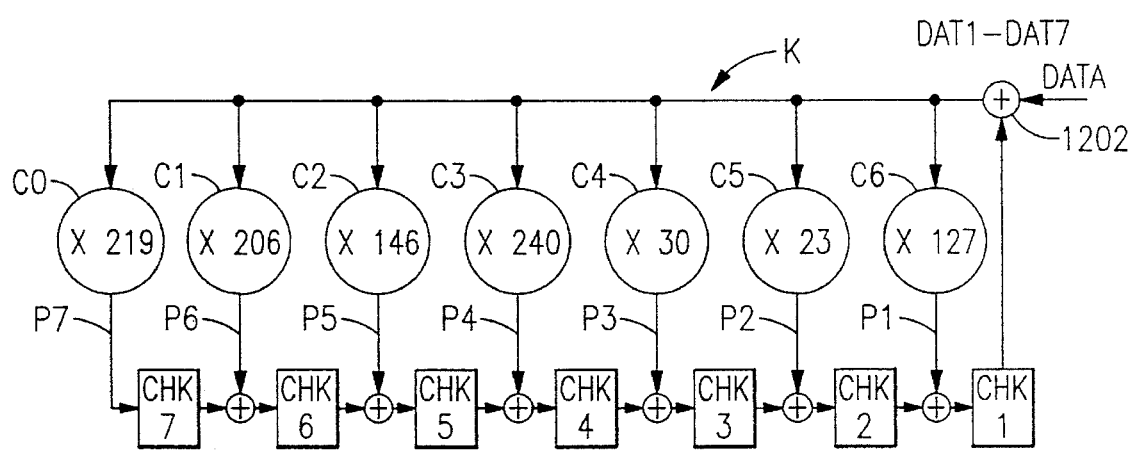
FIG. 12 is a diagram useful for understanding encoding check bytes into the symbol shown in FIG. 1.

The process of computing the check bytes for encoding into a symbol can be understood with reference to FIG. 12, and Listing 3, wherein Reed-Solomon error correction is defined using algebra of finite fields. Any variation of Reed-Solomon encoding can be employed without departing from the spirit of the invention. In the preferred embodiment systematic encoding is used, so that the information in the data bytes appears explicitly followed by the check bytes.

The 256 elements of GF(256) can be numbered 0 through 255, but they are not ordered as 0, 1, 2, 3 ..., 255. The routines for multiplication and division are provided in Listing 1. Briefly addition and subtraction are carried out as the logical exclusive-OR of the two numbers $$X \oplus Y$$

Multiplication of two numbers X and Y is accomplished in accordance with the formula $$XY = antilog[(logX + logY) \mod 255]$$

Division of two numbers X and Y is accomplished in accordance with the formula $$X \div Y = antilog[(logX - logY) \mod 255]$$

It will be appreciated by those skilled in the art that standard addition is used in the multiplication and division formulas, rather than the exclusive OR operation because the exponents of the nonzero elements of GF(256) are ordered 0, 1, 2, 3, ..., 254.

To encode 7 check bytes CHK1–CHK7, it is necessary to initially set each check byte to zero. This is done in the BASIC procedure ERASE CHK. A value CHK8 is required as a consequence of the program logic, and it is also set to zero. The seven data bytes DAT1–DAT7 are fed into the system one-by-one. As each byte enters the system, it is first XORed with the contents of CHK1 then existing at step 1202 to yield a result K. K is multiplied (see Listing 2) with each of the generator polynomial coefficients C0–C6 to yield seven intermediate products P0–P6. The values of CHK1–CHK6 is then sequentially computed in ascending order as the XOR of the intermediate product having the same index and the CHK register having the next higher index. CHK7 is simply replaced by the value of P7. The check bytes are preferably complemented to guarantee that message bytes having zero values do not result in check bytes that have zero value.

The final 14-byte message is the seven message-carrying data bytes followed by seven check bytes computed as discussed above.

PHYSICAL SYMBOL STRUCTURE

FIG. 1 shows a representative Code Z symbol 10 consisting of a Start pattern 12, Symbol Characters comprising both the encoded message 14, the Reed-Solomon check 16, and a Stop pattern 18. The symbol characters each represent 8 bits of data and are thus called "bytes." Code Z is a fixed length symbology with a fixed apportionment of seven message bytes and seven check bytes in its initial embodiment, and it needs no quiet zones at all.

FIG. 2 shows in detail the start pattern 21, stop pattern 23, and byte patterns 26. The Start and Stop patterns are nearly mirror images for ease of bi-directional decoding, composed of strictly narrow bars and variable-width spaces in a burst of 5 elements (S-B-S-B-S), indicated by reference numerals 22, 22'. The bursts 22, 22' are each smaller in total width than the single adjacent wide space 24, 24'. This is a fairly easy pattern for a decoder to "find." The byte pattern 26 has eight bits (0–7 in the lower portion of FIG. 2), and is bracketed by a bar element 27 on one side, and a space element 28 on the other. The bracketing elements 27, 28 serve to define the data-containing portions of the code words, and to separate code words from one another and from the start and stop patterns.

FIG. 3 illustrates some of the types of print defects and damage a Code Z symbol can sustain and still remain readable. A correctly imprinted symbol 10 is defectively shown in FIGS. 3a and 3b. Defects encountered in practice include extra bars 32, or missing bars 34, dot-row under-cutting that creates spaces between module positions (at reference numeral 36, for example), and occasional dot rows mispositioned by up to +½ dot pitch (not shown).

The bytes or symbol characters 26 are each a 10X wide field with the first module dark, the last module light, and the interior modules dark or light, representing "1" or "0" respectively, according to the bits of byte value being represented, with the most significant bit first.

Most conventional bar code symbologies have a fixed number of contiguous bars per symbol character as well as a fixed total character width. This new symbol character 26 is more space efficient than most but it can have as few as one or as many as five discrete bars in its 10X width, dictating a non-standard approach to decoding. The recommended decode algorithm calls for finding first the regular stop/start edge transitions that bracket each character, then dividing its width into 10 time modules, and then sampling at the midpoint of each module to extract the bit values. This algorithm provides no protection against individual bit errors.

Figure 13:
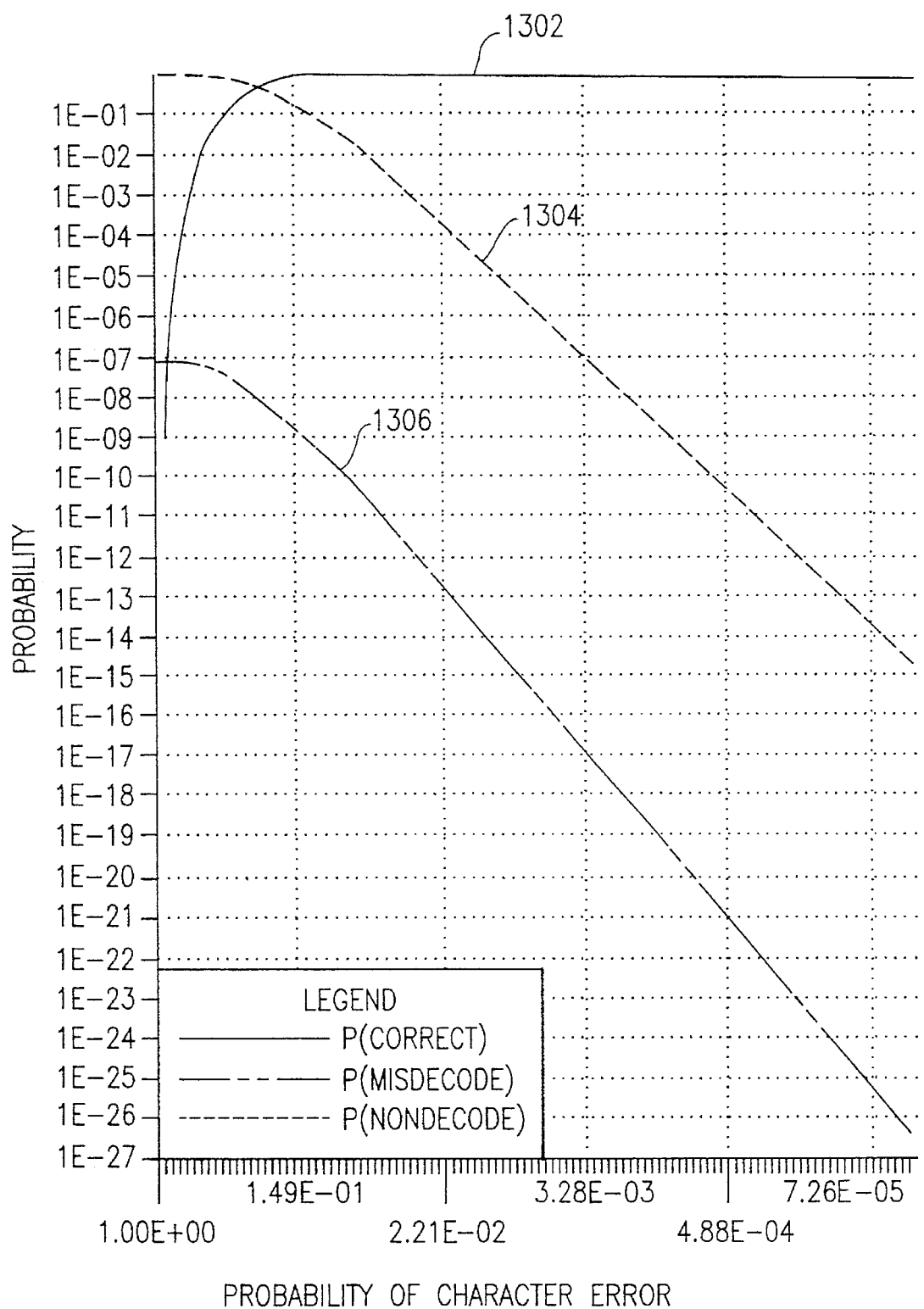
FIG. 13 is a graph indicating the performance of a system reading bar code structures of the type illustrated.

The Reed-Solomon check bytes 16 added to the message 14 provide both error correction and high data security. In a preferred embodiment, Code Z includes 7 check bytes for 7 data bytes, so that error correction performed on the decoded byte string can correct bit errors in up to 3 of the bytes. If there are more errors, these will be falsely corrected in fewer than one in 14 million scans. Instead, the scan results in a non-read. In FIG. 13 there is shown a graph illustrating the performance of reading bar code symbols printed in accordance with Code Z. The performances are plotted in lines 1302, 1304, 1306 against the probabilities of character error in all fourteen bytes of the symbol. The robustness of code Z will be readily apparent to those skilled in the art.

DECODING

The process of decoding a Code Z symbol will be explained with reference to FIGS. 4–10. For purposes of the discussion it will be understood that successive element widths are automatically timed, stored, and indexed. The most recently fetched element has a width denoted by $E_n$; the width of its immediate predecessor is $E_{n-1}$, and so forth.

High Level Decoding: Turning first to FIG. 4, there is shown the overall process of decoding. The decoder waits for the appearance of a start pattern or a stop pattern at step 402. CharCount, a counter, is then initialized to zero at step 404. The next character is decoded at step 406, and its decoded value stored in an indexed memory array at step 408. CharCount is incremented at step 410, and tested at step 412. If CharCount is less than 14, the process loops back to step 406 for decoding of another character. Otherwise the current character is evaluated to determine if it is a stop or start character at step 414. If it is not, the process loops back to step 402. If the current character is a start or stop character, an error check of the 14 decoded bytes is performed at step 416. If the error check fails, the process loops back to step 402 to await another start or stop character. If the error check is passed, a decoded message is then output.

Detection of a start or stop pattern: The detection of a start and stop pattern can be understood with reference to FIG. 5. The process begins by fetching the next bar and the next space at steps 502 and 504 respectively. At step 506 a test is made to determine if the width of the current space, $E_n$ satisfies the inequality $$E_n > \sum_{n-6}^{n-2} E_i$$

If this test does not succeed, the process loops back to step 502 to fetch another bar and space. Otherwise a second validity test is made at step 508 to determine if the following inequality is satisfied $$E_{n-1}+E_{n-3}+E_{n-5} < E_{n-2}+E_{n-4}+E_{n-6}$$

If this test fails, the process loops back to step 502 to fetch another bar and space. Otherwise the variable TENX is initialized at step 510 as follows:

$$TENX = \sum_{n-3}^{n} E_i$$

The variable WIDTH is set to zero at step 512. At this point it is known that either a stop pattern or a start pattern is present. The two possibilities are discriminated beginning at step 514. If the inequality $$E_{n-4} < E_{n-6}$$

is satisfied the pattern is determined to be a start pattern, and the variable DIR, indicating the direction of scan, is set to FWD at step 516. Otherwise the pattern is a stop pattern, and DIR is set to REV at step 520. It is then necessary to fetch another bar (the bar immediately to the left of space 24' in FIG. 2) at step 522.

Decoding the Next Character. This process is presented in FIGS. 6 and 7 and is accomplished in two stages. First the character's width is determined. Once this is known, in a second stage the locations of the centers of each element or module in the character can be determined and sampled. This is a consequence of the fixed width format of code Z.

First at step 602 the current values of the variables n and WIDTH are saved by respectively assigning them to n' and WIDTH'. The next character's minimum and maximum widths (MINWID and MAXWID respectively) are computed respectively as 7/8 TENX and 9/8 TENX in steps 604 and 606. Then, at step 608, the two next elements, $E_{n-1}$ and $E_n$ are fetched, and the value of WIDTH is set as follows:

$$WIDTH = WIDTH + E_{n-1} + E_N$$

At step 612 the value of WIDTH is tested to determine if it is less than MINWID. If this is the case, the process loops back to step 608 to fetch two more elements.

If the test at step 612 fails, the value of WIDTH is compared with MAXWID. If WIDTH exceeds MAXWID, WIDTH is reduced by the value of TENX at step 616. Otherwise TENX is set to WIDTH, and WIDTH reset to zero at steps 618 and 620 respectively. AT this point the width of the character has been determined, and the second stage of the decoding operation commences.

At step 702 WIDTH' is scaled upward by a factor of 20. The variable BYTE, which holds the character value of the byte being evaluated, is initialized to 1 at step 704. At step 706 a test is made to determine whether the inequality $$WIDTH' > 3\ TENX$$

is satisfied. If not, then at step 708 WIDTH' is incremented by 20 $E_n$, and n' is incremented at step 710. The program then loops back to step 706.

If the test at step 706 is passed, then WIDTH' is decremented by 2 TENX at step 712. The value of BYTE is reassigned in step 714 according to the formula $$BYTE = 2\ BYTE + (n' modulo\ 2)$$

Then, at step 716 the value of BYTE is tested to determine if its unsigned value is less than 256. If so, the process loops back to step 706. Otherwise BYTE is complemented in step 718 to yield its character value.

Confirming a final Stop or Start Character: This process is explained with reference to FIGS. 8 and 9. The process begins at step 802. At step 804 the value of WIDTH is tested. If the value is nonzero, the process reports failure at step 912. Otherwise the scanning direction is tested at step 806. If the direction is FWD, then another bar is fetched at step 808, then 7 more elements are fetched at step 810. On the other hand, if the direction is not FWD, the process proceeds directly to step 810.

After fetching the appropriate number of elements, a test is made at step 812 to determine if the inequality $$E_{n-6} > \sum_{n-4}^{n} E_i$$

is satisfied. If not, the program reports failure at step 912. If the test at step 812 is passed, then a further test is made at step 814 to determine if the following inequality is satisfied.

$$E_{n-1}+E_{n-3}+E_{n-5} < E_n+E_{n-2}+E_{n-4}$$

If not, the program reports failure at step 912. Otherwise MINWID and MAXWID are assigned the values $$MINWID = \frac{7}{8} TENX$$

$$MAXWID = \frac{9}{8} TENX$$

at step 816. Then, at step 818 a test is made to determine if the inequality $$MINWID < \sum_{n-6}^{n-3} E_i$$

Is satisfied. If not the process reports failure at step 912. Otherwise, another test is made at step 902 to determine if the inequality $$\sum_{n-6}^{n-3} E_i < MAXWID$$

is satisfied. If not the process reports failure at step 912. A test is next made at step 904 to determine if the inequality $$E_n < E_{n-2}$$

is satisfied. If so a check is made at step 906 to determine if the scanning direction DIR is FWD. If so the process reports success at step 910. If the test at step 906 fails, the process reports failure at step 912. Returning to the test step 904, if the inequality tested therein is not satisfied, a test is made at step 908 to determine if DIR is REV. If so the process reports success at step 910. Otherwise failure is reported at step 912.

Error Checking and Correction. This process is explained with reference to FIG. 10 and begins at step 1002. The seven check bytes are complemented at step 1004, and seven syndromes are computed at step 1006. At step 1008 the seven syndromes are tested. If all are zero, the process reports success at step 1020. Otherwise a Massey procedure is performed in order to generate a locator polynomial at step 1010. A Chien search is done at step 1012 to locate errors. A test is next made at step 1014 to determine if the number of roots is equal to the order of the locator polynomial. If not, then the process reports failure at step 1018. If the test at step 1014 is passed, a Forney procedure is performed at step 1016 to correct errors, and the process then reports success at step 1020. The Massey procedure, Chien search, and Forney procedures are well known and are described, for example, in Theory and Practice of Error Control Codes, Blahut, Richard (Addison-Wesley, 1983). Alternate methods for decoding Reed-Solomon are well known in the art and described also in Blahut.

WRITING AND READING OPERATIONS

Figure 11:
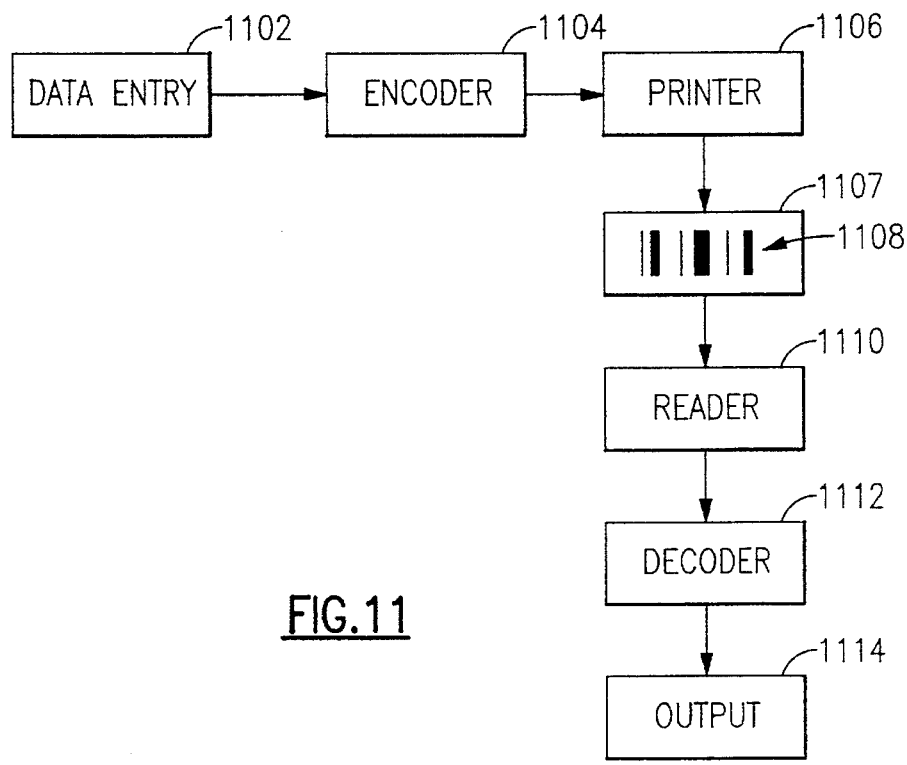
FIG. 11 is a block diagram of a system for encoding, printing, and reading the bar code structure of FIG. 1.

Turning now to FIG. 11, there is shown a system that employs symbols in accordance with Code Z for transferring data to a carrier medium and reading the data encoded thereon. The user desiring to represent data on a carrier first interacts with a data entry device 1102 to enter data therein. This is typically a conventional keyboard or the like. Information output by the data entry device 1102 is then converted into 14 bytes of information by encoder 1104 in the manner explained above. The encoder 1104 maintains a binary representation of the code words of they Code Z symbol in a memory. The data entry device 1102 and encoder 1104 can be realized as a general purpose computer. The output of the encoder 1104 is coupled to a printer 1106 which transfers an image of a Code Z symbol 1108 containing the encoded information onto a carrier medium 1107. Preferably a logical 1 is represented by a bar and a logical 0 by a space. Of course it is possible to reverse this convention. The carrier medium 1107 can be paper, plastic, or any medium suitable for the writing of indicia thereon. It is also possible to transfer human readable information (not shown) onto the carrier medium 1107 together with the symbol 1108. Many variations of the data entry, encoding and printing apparatus are possible. For example the data could originate from a memory device of any kind, and the printer could produce symbols in non optical form, such as magnetic ink.

The symbol 1108 can be scanned by a bar code reader, such as a suitably programmed Welch-Allyn model ST-3000. The output of the reader is presented to decoder 1112, preferably as a digitized signal. Decoder 1112 outputs decoded character information to an output device 1114. The decoder 1112 can be included within the reader unit. The output device 1114 can be a printer, display, computer memory, or other suitable device. In any case the output will be an accurate representation of the information that was originally entered into data entry device 1102.

While this invention has been explained with reference to the structure disclosed herein, it is not confined to the details set forth and this application is intended to cover any modifications and changes as may come within the scope of the following claims:

What is claimed is:

1. A bar code structure containing encoded information therein comprising:

a start pattern, a stop pattern and a predetermined number of code words therebetween, said start pattern, said stop pattern and said code words being arranged in a single row, said code words comprising:
a plurality of elements having identical width dimensions, each element being selected from the group of a bar and a first space;
said code words being separated from one another by a said element, and including at least one data word and at least one check word that is calculated from said data word by Reed-Solomon encoding.

2. The bar code structure according to claim 1, wherein said start pattern and said stop pattern each comprise:
a group comprising a plurality of said bars alternating with a plurality of second spaces; and
a third space having a width dimension that exceeds a width dimension of said group.

3. The bar code structure according to claim 2, wherein said second spaces vary in width.

4. The bar code structure according to claim 3, wherein said group comprises three said second spaces and two said bars.

5. The bar code structure according to claim 1, wherein said Reed-Solomon encoding is performed systematically.

6. The bar code structure according to claim 1, wherein said code words each comprise bytes having eight bits.

7. The bar code structure according to claim 6, wherein said code words comprise seven data bytes and seven check bytes.

8. A method for decoding a bar code symbol having a structure comprising:
a start pattern, a stop pattern and a predetermined number of code words therebetween, said start pattern, said stop pattern and said code words being arranged in a single row, said code words comprising:
a plurality of elements having identical width dimensions, each element being selected from the group of a bar and a first space;
said code words being separated from one another by a said element, and including at least one data word and at least one check word;
the method comprising the steps of:
determining a first value of each of said code words; and performing a Reed-Solomon decoding of said first values.

9. The method according to claim 8, wherein said step of performing a Reed-Solomon decoding is achieved by the steps of:
computing all syndromes of said first values; and generating a locator polynomial by the application of Massey's algorithm to said syndromes.

10. The method according to claim 9, wherein said step of performing a Reed-Solomon decoding further comprises the steps of:
determining the roots of said locator polynomial; and performing a Forney procedure utilizing said roots, said syndromes and said code words to correct errors in said code words.

11. The method according to claim 10, wherein said step of determining the roots of said locator polynomial is performed by a Chien search.

12. A bar code structure containing encoded information therein comprising:
a start pattern, a stop pattern and a fourteen code words therebetween, said start pattern, said stop pattern and said code words being arranged in a single row;

said code words each comprising eight elements having identical width dimensions, each element being selected from the group of bar and a first space, said code words further comprising seven data words and seven check words that are calculated from said data words by systematic Reed-Solomon encoding using a $2^8$ Galois Field;

said code words each being bracketed by a said bar and a said first space;

said start pattern and said stop pattern each comprising:
  a group comprising three second spaces in alternation with two said bars; and
  a third space having a width dimension that exceeds a width dimension of said group.

13. The method in accordance with claim 12, wherein said step of determining the roots of said locator polynomial is performed with a Chien search.

14. The method in accordance with claim 12, further comprising the step of scanning the bar code symbol prior to performing said step of determining a first value.

15. The method in accordance with claim 12, wherein said code words each comprise eight elements further comprising seven data words and seven check words that are calculated from said data words by systematic Reed-Solomon encoding using a $2^8$ Galois Field;

said code words are each bracketed by a said bar and a said first space; and said start pattern and said stop pattern each comprise: a group comprising three second spaces in alternation with two said bars; and a third space having a width dimension that exceeds a width dimension of said group.

16. The method in accordance with claim 15, further comprising the step of outputing said decoded data words.

17. A method for transferring a bar code symbol having a structure in accordance with claim 1 to a carrier medium, comprising the steps of:

entering data into a data entry device;

encoding said data into a representation of the bar code symbol; and transferring an image of the bar code symbol onto the carrier medium.

18. The method in accordance with claim 17, wherein said code words each comprise eight elements further comprising seven data words and seven check words that are calculated from said data words by systematic Reed-Solomon encoding using a $2^8$ Galois Field;

said code words are each bracketed by a said bar and a said first space; and said start pattern and said stop pattern each comprise:
  a group comprising three second spaces in alternation with two said bars; and a third space having a width dimension that exceeds a width dimension of said group.

* * * * *